United States Patent Office 3,031,000
Patented Apr. 24, 1962

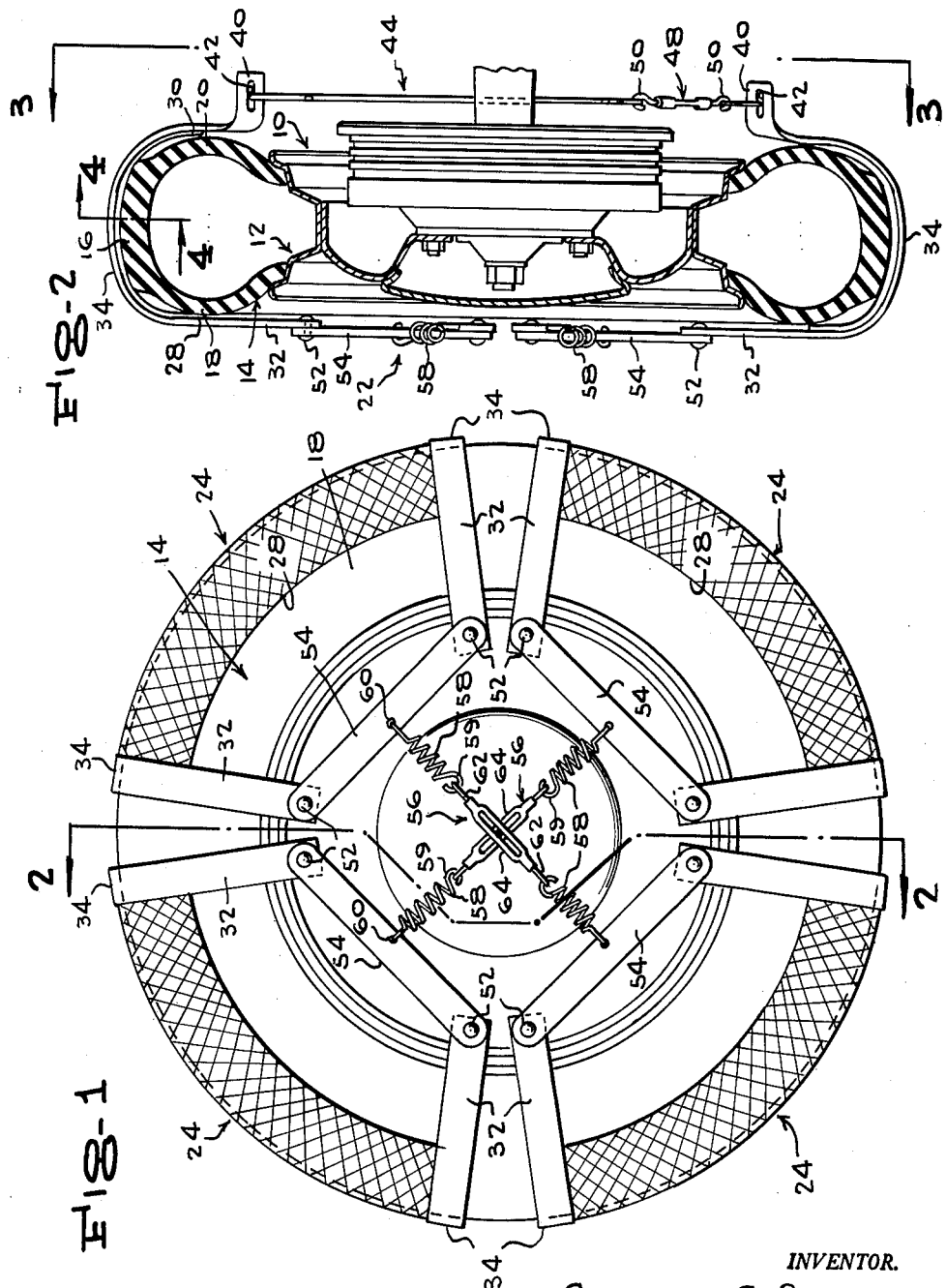

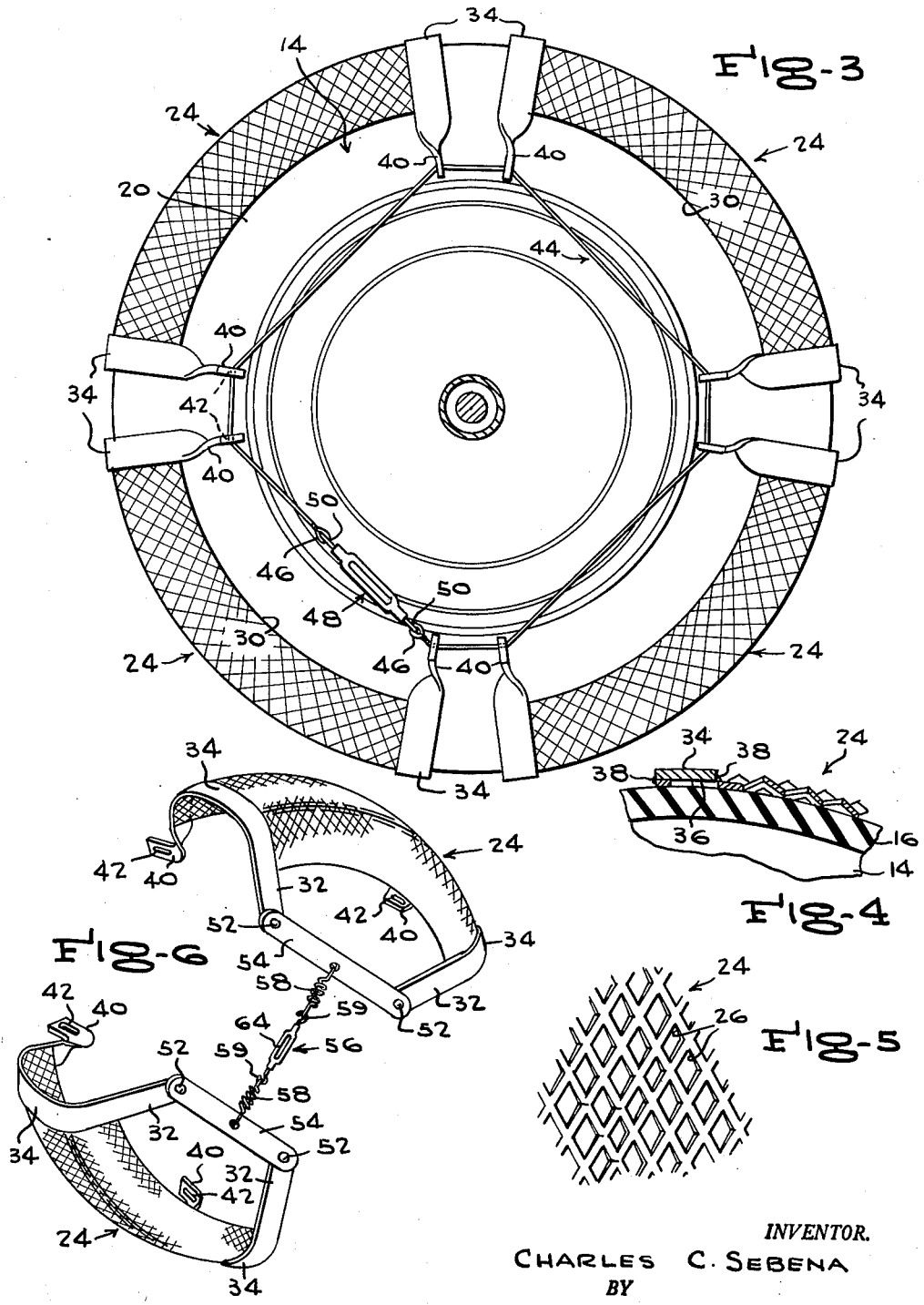

3,031,000
ANTI-SKID DEVICE
Charles C. Sebena, 11725 S. Ridgeland-Melody Lane 29, Worth, Ill.
Filed June 2, 1961, Ser. No. 114,481
5 Claims. (Cl. 152—218)

This invention relates to a novel anti-skid device for tire-equipped vehicle wheels.

The primary object of the invention is the provision of a more efficient and effective device of the kind indicated, which involves a plurality of opposed pairs of relatively long tire tread embracing members which are spaced from each other at relatively short distances, said members being of flexible but shape-retaining open mesh character, said members having radial levers fixed on their ends, which, at their inward ends, are articulated together, and connected to radial contractile spring means.

Another object of the invention is the provision of a device of the character indicated above, wherein the radial contractile spring means is adjustable, and is located at the outer or outboard side of the wheel on which the tire is mounted, flexible and adjustable but non-stretchable contractile means being located at the inner or inboard side of the wheel and connected to inboard portions of said levers.

A further object of the invention is the provision of a device of the character indicated above wherein, the tire tread engaging members are arcuate channel forms formed of reticulated metal.

Other important objects and advantageous features of the invention will be apparent from the following description and the accompanying drawings, wherein, for purposes of illustration only, a specific form of the invention is set forth in detail.

In the drawings:

FIGURE 1 is an outboard side elevation of a tire-equipped vehicle wheel having an anti-skid device of the invention installed thereon;

FIGURE 2 is a transverse section taken on the line 2—2 of FIGURE 1;

FIGURE 3 is an inboard side elevation of FIGURE 1 taken on the line 3—3 of FIGURE 2;

FIGURE 4 is an enlarged fragmentary vertical longitudinal section taken on the line 4—4 of FIGURE 2;

FIGURE 5 is a fragmentary perspective view, on the scale of FIGURE 4, of a portion of a reticulated shoe; and FIGURE 6 is an exploded perspective view, on a reduced scale, of an opposed pair of reticulated shoes and their contractile spring means.

Referring in detail to the drawings, wherein like numerals designate like parts throughout the several views, a vehicle wheel 10 is shown, having a rim 12, in which a pneumatic tire 14 is mounted, the tire having a tread 16, and outboard and inboard side walls 18 and 20, respectively. An anti-skid device of the present invention, generally designated 22, is shown installed on the tire 14.

The device 22 comprises diametrically opposed pairs of shoes 24 which are elongated arcuate channel forms of U-shaped cross section. The shoes 24 are, as shown in FIGURES 4 and 5, formed of reticulated flexible metal, of substantial thickness, the reticulations 26 being preferably of diamond shape and evenly distributed, in closely spaced relationship, with edges thereof canted out of the planes of the shoes. As shown in FIGURE 2, the shoes 24 are wider than the tread 16 of the tire 14, and reach to but do not significantly bear against the side walls 18 and 20 of the tire, the sides of the shoes terminating in free radially inward edges 28 and 30 which are concentric with the axis of the vehicle wheel 10.

Radially inwardly extending flat levers 32, located at the outboard side wall 18 of the tire 14, have, on their radially outward ends, inboardly extending flat arcuate hooks 34, which, as shown in FIGURES 2, 4, and 6, bear upon flat transverse end portions 36 of the shoes, and are suitably fixed thereon, as by means of weldings 38. The hooks 32 terminate, at their inboard ends, in laterally inwardly extending lugs 40 which are twisted into radial planes and which are formed with central longitudinally elongated openings 42, through which a flexible but non-stretchable cable 44 is trained. The cable 44 terminates, at its ends, in eyes or hooks 46, and a turnbuckle 48 extends between the eyes 46, at a location between the levers 32 of a shoe 24, and has eyes or hooks 50, on its ends, which are engaged through the cable eyes or hooks 46.

The levers 32 are relatively short and have pivoted, at 52, on the outboard sides of their inner ends of the levers of each shoe 24, related ends of straight flat chordal bars 54, which, with respect to diametrically opposed shoes 24, are normally and initially in parallel spaced relationship. Diametrically opposed chordal bars 54, have adjustable contractile spring assemblies 56 extending therebetween.

The spring assemblies 56 comprise contractile coil springs 58, connected, at their radially outward ends, as indicated at 60, to midlength points of the bars 54, and, at their radially inward ends, have hooks 59 which are removably engaged through eyes 62 on related ends of turnbuckles 64. As shown in FIGURE 1, the turnbuckles 64 are in crossed relationship, and can bear against each other.

It is to be noted that adjacent sides of shoes 24 are relatively closely spaced relative to each other, and that, at the ends of the shoes, the lever hooks 34 need not extend radially outwardly beyond the radially outward surfaces of the shoes 24, far enough to produce "bumping" as the vehicle wheel rolls on iced or snow-covered surfaces. However, the hooks 34 serve as transversely extending additional "cleats" which increase the traction of the wheel. Further, both the hooks 34 and the shoes 24 are flexible enough to substantially conform to radial flattenings and radial expansions of the tire tread 16, as well as axial expansions and contractions of the tread, as the wheel 10 rolls upon a road or other surface, and the spring assemblies 56 and the cable 44 maintain the shoes 24 engaged with the tire tread 16 and reduce or prevent "working" of the device around the tread 16 and minimize frictional damage to the tread.

The antiskid device 22 can be installed in different ways, depending, in some degree, upon the shape and downward reach of fenders enclosing vehicle wheels. However, even in the cases where, as on late model automobiles, the fenders extend downwardly a substantial distance below the tops of the wheels, all of the shoes 24 of the device 22 can be installed except one, without moving the automobile, by applying to the tire 14, one shoe at a time, and connecting a spring assembly 56 to two opposed shoes while leaving the other spring assembly 56 connected to a shoe therebetween and unconnected to the final shoe. The vehicle is then moved so as to render accessible the remaining part of the tread 16 of the tire 14, whereupon the final shoe is easily applied and the unconnected spring assembly connected to the final shoe. The above outlined operations are conducted with the cable 44 in a slack condition, and when all of the shoes 24 are in place, the cable 44 is tightened by means of the turnbuckle 48. The turnbuckles 64 of the spring assemblies 56 are then checked for adequate and even tension, and tightened if necessary.

Although there has been shown and described a preferred form of the invention, it is to be understood that the invention is not necessarily confined thereto, and that any change or changes in the structure of and in the

What is claimed is:
1. In combination, a resilient vehicle wheel tire having a tread and outboard and inboard side walls, a plurality of pairs of diametrically opposed flexible channel shoes engaged over the tire tread, said shoes being circumferentially elongated and being circumferentially spaced from each other, said shoes having radially inwardly extending levers fixed on their ends, said levers having circumferentially spaced inward ends, chordal bars extending between and pivoted at their ends to the inward ends of the levers, and radial spring assemblies stretched between and connected to the centers of opposed chordal bars of diametrically opposed shoes.

2. In combination, a resilient vehicle wheel tire having a tread and outboard and inboard side walls, a plurality of pairs of diametrically opposed flexible channel shoes engaged over the tire tread, said shoes being circumferentially elongated and being circumferentially spaced from each other, said shoes having radially inwardly extending levers fixed on their ends, said levers having circumferentially spaced inward ends, chordal bars extending between and pivoted at their ends to the inward ends of the levers, and radial spring assemblies stretched between and connected to the centers of opposed chordal bars of diametrically opposed shoes, said levers having transversely extending hooks on their radially outward ends which are fixed to the shoe ends and extend crosswise of the shoes and have end portions which extend radially inwardly along a side wall of the tire, said end portions having lateral lugs, and cable means connected to the lugs.

3. In combination, a resilient vehicle wheel tire having a tread and outboard and inboard side walls, a plurality of pairs of diametrically opposed flexible channel shoes engaged over the tire tread, said shoes being circumferentially elongated and being circumferentially spaced from each other, said shoes having radially inwardly extending levers fixed on their ends, said levers having circumferentially spaced inward ends, chordal bars extending between and pivoted at their ends to the inward ends of the levers, and radial spring assemblies stretched between and connected to the centers of opposed chordal bars of diametrically opposed shoes, said spring assemblies comprising pairs of coil springs having outer ends connected to the chordal bars and inward ends, and turnbuckles having hooks on their ends separably connected to the inward ends of the coil springs.

4. In combination, a resilient vehicle wheel tire having a tread and outboard and inboard side walls, a plurality of pairs of diametrically opposed flexible channel shoes engaged over the tire tread, said shoes being circumferentially elongated and being circumferentially spaced from each other, said shoes having radially inwardly extending levers fixed on their ends, said levers having circumferentially spaced inward ends, chordal bars extending between and pivoted at their ends to the inward ends of the levers, and radial spring assemblies stretched between and connected to the centers of opposed chordal bars of diametrically opposed shoes, said levers having transversely extending hooks on their radially outward ends, which are fixed to the shoe ends and extend crosswise of the shoes and having end portions which extend radially inwardly along a side wall of the tire, said shoes being reticulated and having uniformly distributed openings.

5. In combination, a resilient vehicle wheel tire having a tread and outboard and inboard side walls, a plurality of pairs of diametrically opposed flexible channel shoes engaged over the tire tread, said shoes being circumferentially elongated and being circumferentially spaced from each other, said shoes having radially inwardly extending levers fixed on their ends, said levers having circumferentially spaced inward ends, chordal bars extending between and pivoted at their ends to the inward ends of the levers, and radial spring assemblies stretched between and connected to the centers of opposed chordal bars of diametrically opposed shoes, said levers having transversely extending hooks on their radially outward ends which are fixed to the shoe ends and extend crosswise of the shoes and have end portions which extend radially inwardly along a side wall of the tire, said shoes being reticulated and having uniformly distributed openings, said openings being diagonally disposed diamond-shaped openings.

References Cited in the file of this patent

UNITED STATES PATENTS

| 1,016,846 | Myers | Feb. 6, 1912 |
| 1,101,198 | Lashar | June 23, 1914 |
| 1,360,866 | Barniak | Nov. 30, 1920 |
| 2,436,549 | Boyer | Feb. 24, 1948 |
| 2,450,776 | Achenbach | Oct. 5, 1948 |
| 2,886,091 | Hines | May 12, 1959 |